Mar. 27, 1923.  
F. A. CONNOLLY  
ELASTIC TIRE  
Filed Aug. 26, 1922.

1,449,588

WITNESS  
Wm. L. Bell

INVENTOR,  
Frank A. Connolly  
BY  
John Steward  
ATTORNEY.

Patented Mar. 27, 1923.

1,449,588

UNITED STATES PATENT OFFICE.

FRANK A. CONNOLLY, OF POMPTON LAKES, NEW JERSEY, ASSIGNOR OF ONE-HALF TO JOHN MATHES, OF POMPTON LAKES, NEW JERSEY.

ELASTIC TIRE.

Application filed August 26, 1922. Serial No. 584,517.

*To all whom it may concern:*

Be it known that I, FRANK A. CONNOLLY, a citizen of the United States, residing at Pompton Lakes, in the county of Passaic and State of New Jersey, have invented certain new and useful Improvements in Elastic Tires, of which the following is a specification.

This invention is designed to fulfill the requirement for a practical vehicle tire of the class in which air or other fluid is used as the principal cushioning element that cannot be put out of service by any ordinary instance of possibility of such fluid to escape, as by puncture. It contemplates constructing the tire with contained fluid cushions, formed say by sealed fluid cells therein, in which the cushions shall preferably be arranged therein successively around, and also at different distances from and in different planes at right angles to, the rotating axis of the tire. The cushions will also preferably be arranged in a plurality of series concentric with respect to said axis, those in any one series being out of radial alinement with those in the next adjoining series. Further, any two cushions that are in adjoining radial (or transverse) planes will not be in the same plane at right angles to the axis of the tire, but staggered.

Figure 1:
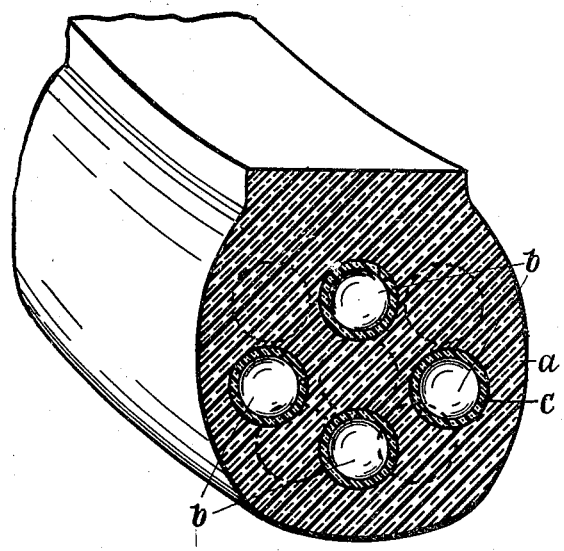
Figure 2:
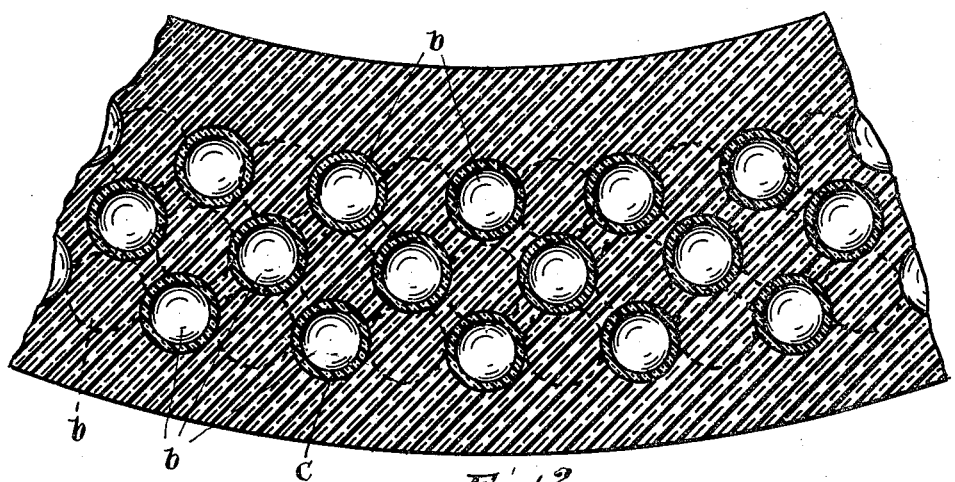

Describing the improved tire in more detail and with reference to that specific form thereof by way of example which appears in the accompanying drawing, Fig. 1 is a transverse sectional-perspective view of a fragment thereof; and Fig. 2 is a sectional view of a fragment taken in a plane at right angles to the axis of rotation.

$a$ is a circular mass of some suitable elastic material and $b$ the cushions formed by fluid-containing cells arranged therein so that they are dispersed in the tire as viewed in any principal section, whether taken transversely, in a plane at right angles to the (rotating) axis of the tire, or in a cylinder concentric to said axis. In the present example there are three series of the cells arranged concentrically of said axis, and the cells in any one series are out of radial alinement with the cells in the next adjoining series. This latter makes it possible, as shown, to have fluid present as a cushioning medium in substantially all radial sections of the tire. Further, any two cells (of any series) that are in adjoining radial or transverse planes are not in the same plane at right angles to said axis of the tire, but they are staggered. This makes it possible to bring the cells in any series in quite close radial planes, which is of special advantage with respect to the outermost concentric series because if any one cell in that series fails for any reason to retain its fluid cushion the neighboring cells will serve so far to support the load that there will be no perceptible bump in the rolling of the tire and no injurious kneading of the rubber or like elastic substance $a$ of the tire.

The tire may be formed with the cells in any way. But I prefer to provide spherical yielding hollow bodies $c$ (they may be elastic rubber) and in molding the mass $a$ from the plastic material of which it is formed to mold them therein, since this avoids difficulties of manufacture incident to coring the mass $a$ in molding it in order to form the cells. And in this connection I may remark that, quite aside from any other element of my invention herein set forth, so far as I am aware it is broadly new to form an elastic tire cellular, having first provided hollow yielding bodies, as $c$, by dispersing said bodies in the material from which said mass is to be formed and then forming said material into the desired shape, as by molding.

The cells may in any case, if desired, contain fluid under pressure exceeding atmospheric.

Of course, as in the case of any cellular tire, my tire presents the further advantage that since the defection of any cell is a localized injury it can be satisfactorily repaired even if the cells are inflated because the internal pressure in such a case is not considerable enough to disturb the repair that has been effected.

The expression "transversely" as used in the appended claims has reference to a direction substantially parallel with the axis of rotation of the tire.

Having thus fully described my invention, what I claim as new and desire to secure by letters patent is:—

1. An elastic mass forming a vehicle tire and containing fluid cushions distributed substantially uniformly therein circumferentially, radially and transversely thereof and each having its dimensions measured circumferentially, radially and transversely of the tire approximately equal, the material of the mass filling all the spaces between the cushions.

2. An elastic mass forming a vehicle tire and containing substantially spherical fluid cushions distributed substantially uniformly therein circumferentially, radially and transversely thereof, the material of the mass filling all the spaces between the cushions.

3. An elastic mass forming a vehicle tire and containing fluid cushions distributed substantially uniformly therein circumferentially, radially and transversely thereof and each having its dimensions measured circumferentially, radially and transversely of the tire approximately equal, the part of the mass between each two cushions being relatively thick.

4. A molded vehicle tire mass having, hermetically encased therein and thereby, separately formed hollow yielding fluid-containing bodies arranged one after another circumferentially thereof and each of which is isolated by a portion of the mass from each neighboring body.

In testimony whereof I affix my signature.

F. A. CONNOLLY.